US008864139B2

(12) United States Patent
Greca et al.

(10) Patent No.: US 8,864,139 B2
(45) Date of Patent: Oct. 21, 2014

(54) NON-CONTACT LABYRINTH SEAL ASSEMBLY

(71) Applicant: Federal-Mogul Corporation, Southfield, MI (US)

(72) Inventors: Gerald A. Greca, Carleton, MI (US); Alicia Black, Maybee, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/195,205

(22) Filed: Mar. 3, 2014

(65) Prior Publication Data
US 2014/0246833 A1 Sep. 4, 2014

Related U.S. Application Data

(60) Provisional application No. 61/772,371, filed on Mar. 4, 2013.

(51) Int. Cl.
*F01D 11/02* (2006.01)
*F16J 15/447* (2006.01)

(52) U.S. Cl.
CPC .................. *F16J 15/447* (2013.01)
USPC .......................... 277/412; 277/409

(58) Field of Classification Search
USPC ................. 277/409, 411, 412, 421, 422, 423
See application file for complete search history.

(56) References Cited

U.S. PATENT DOCUMENTS

| 1,145,516 | A | 7/1915 | Schmid-Roost |
| 2,176,294 | A | 10/1939 | Cox |
| 2,945,707 | A | 7/1960 | Justin |
| 3,021,161 | A | 2/1962 | Rhoads |
| 3,072,413 | A | 1/1963 | Parks |
| 3,135,518 | A | 6/1964 | Carson |
| 3,144,280 | A | 8/1964 | Sorenson |

(Continued)

FOREIGN PATENT DOCUMENTS

| JP | 03020175 A | 1/1991 |
| JP | 2526587 | 2/1997 |
| JP | 9144767 | 6/1997 |
| JP | 2007177815 | 7/2007 |

OTHER PUBLICATIONS

Dietrich, Marshall W.; Parker, Richard J.; Zaretsky, Erwin V.; "Comparative Lubrication Studies of OH-58A Tail Rotor Drive Shaft Bearings"; Abstract, Jul. 1972; Lewis Research Center.

*Primary Examiner* — Gilbert Lee
(74) *Attorney, Agent, or Firm* — Robert L. Stearns; Dickinson Wright, PLLC

(57) ABSTRACT

A non-contact labyrinth seal assembly includes a carrier having cylindrical outer flange with an annular leg extending inwardly therefrom. An elastomeric body is attached to the leg. The body has a first pair of seal lips extending radially inwardly in diverging relation from one another and a second pair of seal lips spaced radially outwardly from the first pair of seal lips. The second pair of seal lips includes radially outermost and a radially innermost seal lips. The radially outermost seal lip has a cylindrical inner surface and an inner surface of the radially innermost seal lip has a first portion extending substantially parallel to the cylindrical inner surface to form an annular channel and a second portion extending radially outwardly to an innermost lip free end that is radially aligned with the cylindrical inner surface to form an annular opening having a width less than a width of the channel. A sleeve has an annular barrier extending radially outwardly to an annular flange that extends axially through the opening into the channel.

5 Claims, 1 Drawing Sheet

(56) References Cited

U.S. PATENT DOCUMENTS

| | | |
|---|---|---|
| 3,459,431 A | 8/1969 | Baker |
| 3,510,138 A | 5/1970 | Bowen |
| 3,550,974 A | 12/1970 | Kupchick |
| 3,799,634 A | 3/1974 | Sernetz et al. |
| 3,822,890 A | 7/1974 | Bourgeois |
| 4,093,324 A | 6/1978 | Carrigan |
| 4,139,203 A | 2/1979 | Garrison |
| 4,327,922 A | 5/1982 | Walther |
| 4,373,759 A | 2/1983 | Greener et al. |
| 4,432,557 A | 2/1984 | Drucktenhengst |
| 4,460,803 A | 7/1984 | Piper |
| 4,470,605 A | 9/1984 | Deuring |
| 4,477,693 A | 10/1984 | Krabec et al. |
| 4,699,526 A | 10/1987 | Sato |
| 4,770,424 A | 9/1988 | Otto |
| 4,792,242 A | 12/1988 | Colanzi |
| 4,819,949 A | 4/1989 | Otto |
| 4,825,016 A | 4/1989 | Meltsch et al. |
| 4,848,937 A | 7/1989 | Hartman |
| 4,852,890 A | 8/1989 | Borowski |
| 4,906,111 A | 3/1990 | Martinie |
| 4,974,860 A | 12/1990 | Anzue |
| 4,978,236 A | 12/1990 | Ostiling |
| 4,981,303 A | 1/1991 | Matsushima |
| 5,004,248 A | 4/1991 | Messenger |
| 5,028,054 A | 7/1991 | Peach |
| 5,129,744 A | 7/1992 | Otto |
| 5,183,269 A | 2/1993 | Black |
| 5,201,529 A | 4/1993 | Heinzen |
| 5,211,406 A | 5/1993 | Katzensteiner |
| 5,269,536 A | 12/1993 | Matsushima |
| 5,294,270 A | 3/1994 | Fenical |
| 5,383,549 A | 1/1995 | Mayer et al. |
| 5,387,113 A | 2/1995 | Dickerson et al. |
| 5,532,429 A | 7/1996 | Dickerson et al. |
| 5,617,900 A | 4/1997 | Weil |
| 5,890,812 A | 4/1999 | Marcello |
| 5,895,052 A | 4/1999 | Drucktenhengst et al. |
| 5,965,223 A | 10/1999 | Andrews et al. |
| 6,050,570 A | 4/2000 | Otto |
| 6,213,476 B1 | 4/2001 | Chandler |
| 6,262,371 B1 | 7/2001 | Allen |
| 6,471,211 B1 | 10/2002 | Garnett |
| 6,485,185 B1 | 11/2002 | Conway, Jr. |
| 6,718,100 B2 | 4/2004 | Morris |
| 6,845,986 B2 | 1/2005 | Hood |
| 6,876,797 B2 | 4/2005 | Morris |
| 7,055,828 B2 | 6/2006 | Hatch |
| 8,342,535 B2 | 1/2013 | Lattime et al. |
| 2006/0011384 A1 | 1/2006 | Kwong et al. |
| 2009/0206553 A1 | 8/2009 | Kanzaki |

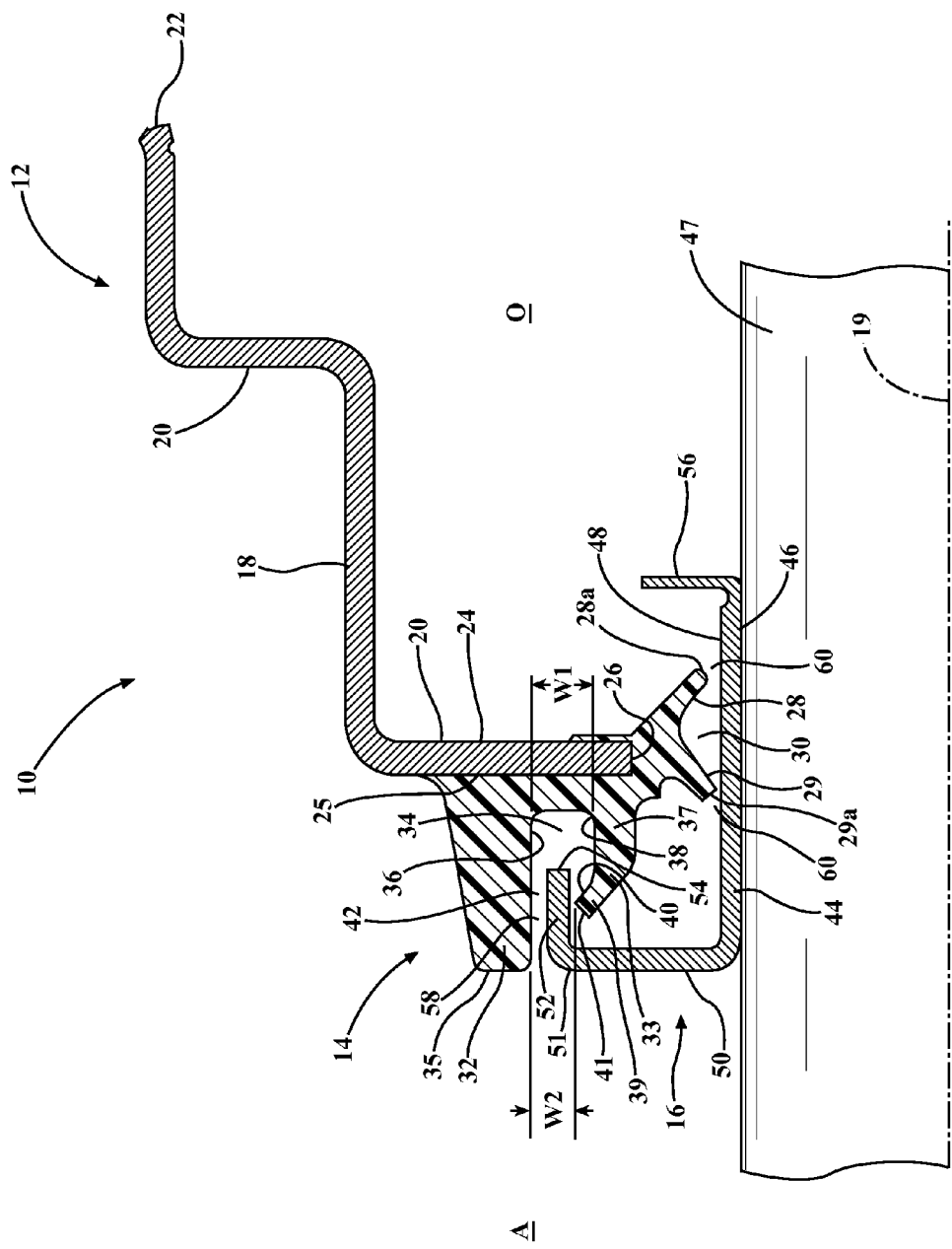

NON-CONTACT LABYRINTH SEAL ASSEMBLY

CROSS-REFERENCE TO RELATED APPLICATION

This application claims the benefit of U.S. Provisional Application Ser. No. 61/772,371, filed Mar. 4, 2013, which is incorporated herein by reference in its entirety.

BACKGROUND OF THE INVENTION

1. Technical Field

This invention relates generally to seal assemblies, and more particularly to non-contact dynamic radial shaft seal assemblies.

2. Related Art

Shaft seals are commonly used throughout numerous types of vehicle applications. Aside from the shaft seal establishing a reliable seal against a running surface of a rotating shaft or wear sleeve, both to prevent the ingress of contamination and the egress of desirable lubrication, it is desirable that the seal provide a minimal running torque against the shaft. A reduced running torque of the seal helps to enhance the overall fuel economy of the vehicle, as lower torque requires less parasitic horse power to turn the shaft, such as a crankshaft, for example, due to less drag produced by the shaft seal against the running surface of the shaft. Unfortunately, compromises are generally necessary in order to accomplish a maximized seal with the shaft.

A shaft seal constructed in accordance with the subject invention addresses the need to accomplish both a reliable seal and minimize friction.

SUMMARY OF THE INVENTION

According to one aspect of the invention, a non-contact labyrinth seal assembly is provided that includes an outer rigid metal carrier having a generally cylindrical outer flange extending axially relative to a central axis of the assembly with a leg extending radially inwardly from the outer flange. An elastomeric body is attached to the leg. The body has a first pair of seal lips extending radially inwardly from the leg that diverge away from one another to first free ends to form a v-shaped annular pocket. The body further has a second pair of seal lips spaced radially outwardly from the first pair of seal lips, wherein the second pair of seal lips include a radially outermost seal lip and a radially innermost seal lip. The radially outermost seal lip has a cylindrical inner surface extending axially in substantially parallel relation with a central axis to an outermost lip free end. The radially innermost seal lip has a first inner surface portion and a second inner surface portion. The first inner surface portion extends substantially parallel to the cylindrical inner surface of the radially outermost seal lip to form an annular channel having a first width. The second inner surface portion extends radially outwardly from the first inner surface portion toward an air side of the assembly to an innermost lip free end. The innermost lip free end is radially aligned with and radially spaced from the cylindrical inner surface of the radially outermost seal lip to form an annular opening, wherein the annular opening has a reduced width relative to the annular channel. The assembly further includes a sleeve having a cylindrical wall for receipt on a shaft and an annular barrier extending radially outwardly from the cylindrical wall to a radially outwardmost end and having an annular exclusion flange extending axially from the radially outwardmost end through the annular opening into the annular channel.

In accordance with another aspect of the invention, the radially outermost seal lip extends axially beyond the innermost seal lip and overhangs the exclusion flange to shroud the exclusion flange against damage and to further facilitate inhibiting the ingress of contamination and the egress of lubrication.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
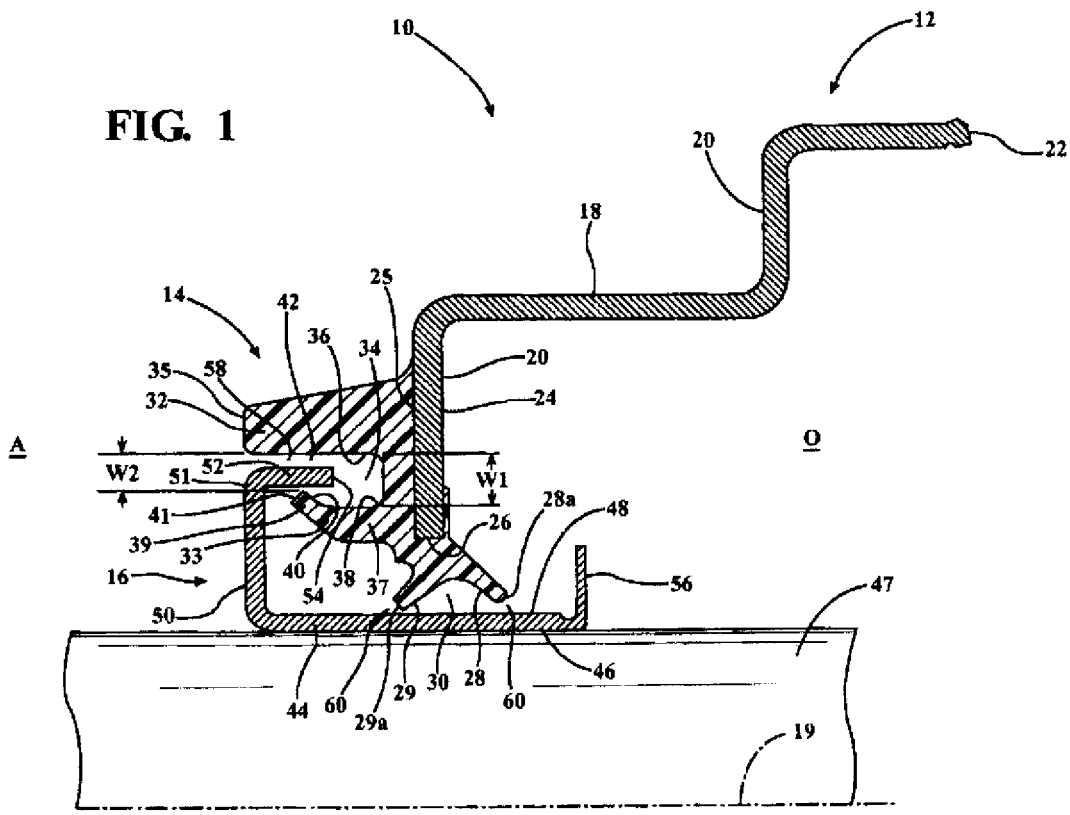
FIG. 1 is a cross-sectional view of a non-contact labyrinth seal assembly constructed in accordance with one presently preferred embodiment of the invention disposed on a shaft.

Referring in more detail to the drawings, FIG. 1 illustrates a non-contact labyrinth seal 10 constructed in accordance with one aspect of the invention. The seal 10 maintains lubrication on an oil side O of the seal 10 and prevents the ingress of contamination from an air side A of the seal 10, such as dirt and debris. Accordingly, the seal 10, having a completely non-contact labyrinth seal construction, as discussed further hereafter, produces minimal friction in use, while effectively preventing the egress of lubrication and ingress of contamination, thus, prolonging the useful life of components contained on the oil-side O of the seal 10.

The non-contact labyrinth seal 10 has an outer rigid carrier 12, preferably constructed from metal, such as from steel in a stamping operation, with an elastomeric body 14 attached thereto, and a metal inner sleeve 16. The carrier 12 has a generally cylindrical outer flange 18 extending axially relative to a central axis 19 of the seal 10 with an annular leg 20 extending radially inwardly from the outer flange 18 toward the central axis 19. The outer flange 18 extends axially to a free end 22 that is preferably configured for direct attachment to a housing member, such as an outer race of a bearing assembly (not shown), for example, though it could be configured for attachment to a housing of any kind. The leg 20 has opposite oil and air sides 24, 25, respectively, that extend to a free end 26. One or both of the sides 24, 25 can be treated, if desired, to facilitate bonding of the seal body 14 thereto, such as in an etching or sand/bead blasting operation, for example.

The elastomeric seal body 14 is attached to the leg 20, such as by using a suitable adhesive or by molding directly to the leg 20. The body 14 is shown here, by way of example and without limitation, as being molded about the free end 26 of the leg 20 and substantially covering the air side 25 of the leg 20. The body 14 has at least one, and shown as a first pair seal lips 28, 29 extending radially inwardly from the free end 26 of the leg 20. The first pair of seal lips 28, 29 diverge away from one another toward the inner sleeve 16 to respective first free ends 28a, 29a, with one of the first seal lips 28 extending toward the oil-side O and the other of the first seal lips 29 extending toward the air-side A. As such, a v-shaped annular pocket 30 is formed between the first pair of seal lips 28, 29. Further, the body 14 has a second pair of seal lips 32, 33 spaced radially outwardly from the first pair of seal lips 32, 33 and spaced radially from one another by an annular channel 34. The second pair of seal lips 32, 33 includes a radially outermost seal lip 32 and a radially innermost seal lip 33, with the radially outermost seal lip 33 extending axially beyond the radially innermost seal lip 33, thereby overhanging the innermost seal lip 33 to effectively shroud the innermost seal lip 33. The radially outermost seal lip 32 has a cylindrical inner surface 36 extending parallel or substantially parallel to the central axis 19, shown as extending cylindrically over its full length beyond the innermost seal lip 33 to an outermost lip free end 35. The radially innermost second seal lip 33 has a first portion 37 closest the leg 20 with a first inner surface portion 38 extending parallel or substantially parallel to the central axis 19 and the cylindrical inner surface 36 of the radially outermost seal lip 33, and an end second portion 39 furthest from the leg 20 having a second inner surface portion 40 extending obliquely relative to the inner surface portion 38 of the first portion 37 and diverging radially outward from the inner surface portion 38 of the first portion 37 toward the air side A. As such, the second portion 39 extends in oblique relation to the central axis 19 in radially outward fashion to an innermost lip free end 41, wherein the free end 41 is radially aligned with and radially spaced from the cylindrical inner surface 36 of the outermost lip 33 by an annular opening 42 having a reduced with relative to the annular channel 34, which acts to inhibit the ingress of contamination and egress of lubrication, as discussed further below.

The metal inner sleeve 16 is preferably constructed from steel in a stamping operation, though other metal materials and processes could be used. The inner sleeve 16 has an axially extending cylindrical wall 44 with a radially inwardly facing cylindrical inner surface 46 configured for receipt on a shaft 47 and a radially outwardly facing cylindrical outer surface 48 opposite the inner surface 46. The sleeve 16 has an annular wall or barrier 50 extending radially outwardly from the cylindrical wall 44 to a radially outwardmost end 51 with an annular exclusion flange 52 extending axially from the from the end 51 of the barrier 50 in generally parallel relation with the central axis 19 in radially outwardly spaced, overlapping relation with the cylindrical wall 62 to a free end 54 facing the oil side O. In addition, the sleeve 16 has a containment flange 56 extending radially outwardly from the cylindrical wall 44. The containment flange 56, in addition to maintaining the seal 10 in an assembled state, assists in preventing lubrication on the oil-side O from escaping the oil side O.

With the carrier 12 assembled to the housing and the inner sleeve 16 disposed on the shaft 47, the seal body 14 and its associated elastomeric features remain in spaced relation from the inner sleeve 16. For example, when fully assembled, the annular exclusion flange 52 of the inner sleeve 16 extends axially in generally parallel relation to the central axis 19 through the reduced width annular opening 42 and into the channel 34. The exclusion flange 52 remains spaced from the inner surface 36 and the second portion 39 of the innermost second seal lip 33 to form a non-contact labyrinth passage 58 extending along a generally u-shaped serpentine path between the radially outward and radially inward seal lips 32, 33. Accordingly, the annular exclusion flange 52 remains in spaced relation from the inner surfaces 36, 38, 40. In addition, with the radially outward seal lip 32 overlying the exclusion 52 in its entirely such that the free end 35 of the radially outward seal lip 32 is radially aligned or substantially radially aligned with the barrier 50, the radially outward seal lip 32 shrouds the exclusion flange 52 in close, non-contacting relation thereto, thereby providing additional protection against the ingress of fluids and other types of contamination, further inhibiting the egress of lubrication, and further providing protecting to the exclusion flange 52 against damage, such as from external environmental debris and other forms of contamination. Further, the first pair of seal lips 28, 29 remains in non-contacting, spaced relation with the outer surface 48 of the inner sleeve 16 to provide a non-contact labyrinth passage 60 extending beneath the first pair of seal lips 28, 29 between the respective free ends 28a, 29a and the outer surface 48 of the inner sleeve 16. Accordingly, the elastomeric body 14 remains entirely spaced from the inner sleeve 16, thereby forming a true non-contact labyrinth seal.

Obviously, many modifications and variations of the present invention are possible in light of the above teachings. It is, therefore, to be understood that within the scope of the appended claims, the invention may be practiced otherwise than as specifically described.

What is claimed is:

1. A non-contact labyrinth seal assembly, comprising:
   an outer rigid metal carrier having a generally cylindrical outer flange extending axially relative to a central axis of said assembly with a leg extending radially inwardly from said outer flange toward said central axis;
   an elastomeric body attached to said leg, said body having a first pair of seal lips extending radially inwardly from said leg and diverging away from one another to first free ends to form a v-shaped annular pocket, and a second pair of seal lips spaced radially outwardly from said first pair of seal lips, said second pair of seal lips including a radially outermost seal lip and a radially innermost seal lip, said radially outermost seal lip having a cylindrical inner surface extending axially in substantially parallel relation with said central axis to a free end, said radially innermost seal lip having a first inner surface portion and a second inner surface portion, said first inner surface portion extending substantially parallel to said cylindrical inner surface of said radially outermost seal lip to form an annular channel having a first width, said second inner surface portion extending radially outwardly from said first inner surface portion toward an air side of said assembly to a free end, said free end of said innermost lip being radially aligned with and radially spaced from said cylindrical inner surface of said radially outermost seal lip to form an annular opening, said annular opening having a reduced width relative to said annular channel; and
   a sleeve having a cylindrical wall and an annular barrier extending radially outwardly from said cylindrical wall to a radially outwardmost end and having an annular flange extending axially from said radially outwardmost end through said annular opening into said annular channel.

2. The non-contact labyrinth seal assembly of claim 1 wherein said outermost seal lip extends axially beyond said innermost seal lip.

3. The non-contact labyrinth seal assembly of claim 2 wherein said free end of said outermost seal lip is substantially radially aligned with said annular barrier.

4. The non-contact labyrinth seal assembly of claim 1 wherein said outermost seal lip overhangs said exclusion flange.

5. The non-contact labyrinth seal assembly of claim 1 wherein said annular barrier is planar.

* * * * *

UNITED STATES PATENT AND TRADEMARK OFFICE
CERTIFICATE OF CORRECTION

PATENT NO. : 8,864,139 B2
APPLICATION NO. : 14/195205
DATED : October 21, 2014
INVENTOR(S) : Greca et al.

Page 1 of 2

It is certified that error appears in the above-identified patent and that said Letters Patent is hereby corrected as shown below:

In the Drawings

Insert the Fig. 1 label as shown on the attached page.

Signed and Sealed this
Seventeenth Day of February, 2015

Michelle K. Lee
*Deputy Director of the United States Patent and Trademark Office*